United States Patent
Ladouceur et al.

(10) Patent No.: US 8,249,676 B2
(45) Date of Patent: Aug. 21, 2012

(54) HANDHELD MOBILE COMMUNICATION DEVICE WITH MOVEABLE DISPLAY/COVER MEMBER

(75) Inventors: Norman M. Ladouceur, Waterloo (CA); Jason T. Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 147 days.

(21) Appl. No.: 12/717,040

(22) Filed: Mar. 3, 2010

(65) Prior Publication Data
US 2010/0160010 A1   Jun. 24, 2010

Related U.S. Application Data

(63) Continuation of application No. 11/458,453, filed on Jul. 19, 2006, now Pat. No. 7,690,576.

(51) Int. Cl.
*H04M 1/00* (2006.01)
(52) U.S. Cl. ............... 455/575.4; 455/556.2; 455/575.1
(58) Field of Classification Search ............ 235/472.01, 235/472.83, 472.86; 379/679.1, 679.02, 379/679.3, 679.6, 679.07, 679.09, 679.24, 379/679.36, 679.58; 455/344, 347, 348, 455/550.1, 556.1, 556.2, 575.1, 575.2, 575.3
See application file for complete search history.

(56) References Cited

U.S. PATENT DOCUMENTS

| | | | |
|---|---|---|---|
| 5,200,913 A | 4/1993 | Hawkins | |
| 6,539,208 B1 | 3/2003 | Mori | |
| 6,636,419 B2 * | 10/2003 | Duarte | 361/679.09 |
| 6,798,649 B1 * | 9/2004 | Olodort et al. | 361/679.13 |
| 6,836,404 B2 * | 12/2004 | Duarte | 361/679.09 |
| 6,842,627 B2 * | 1/2005 | Harsu et al. | 455/550.1 |
| 6,892,082 B2 * | 5/2005 | Boesen | 455/575.3 |
| 7,107,084 B2 * | 9/2006 | Duarte et al. | 455/575.3 |
| 7,158,634 B2 | 1/2007 | Eromaki | |
| 7,225,002 B2 * | 5/2007 | Lee et al. | 455/575.4 |
| 7,355,843 B2 | 4/2008 | Riddiford | |

(Continued)

FOREIGN PATENT DOCUMENTS

EP    1217501    6/2002

(Continued)

OTHER PUBLICATIONS

Extended European Search Report dated Dec. 2, 2010. In corresponding application No. 10185700.1.

(Continued)

*Primary Examiner* — Jean Gelin
*Assistant Examiner* — Michael S Bush
(74) *Attorney, Agent, or Firm* — Fitch, Even, Tabin & Flannery, LLP

(57) ABSTRACT

Handheld mobile communication devices according to the disclosure have a closed position, in which the display member of the device covers at least a portion of the keys of on the keypad member of the device, and an open position, in which the keys are accessible and the device is operated. When the display member is in the open position, it forms an ergonomically desirable angle (e.g., on the order of about 155°) relative to the keypad member. However, unlike clamshell-type cellular phones, the display member does not simply flip open about a conventional pivot joint. Rather, it moves from the closed position, where it is parallel and adjacent to the keypad member, to the open, angled position through a sliding/sweeping motion; through an eccentric, "up-and-over" rotational motion; or through a combination sliding/"up-and-over" motion.

21 Claims, 18 Drawing Sheets

U.S. PATENT DOCUMENTS

| | | | |
|---|---|---|---|
| 7,376,449 B2 * | 5/2008 | Mizuta et al. | 455/575.3 |
| 7,522,945 B2 * | 4/2009 | Kilpi et al. | 455/575.1 |
| 2002/0077161 A1 * | 6/2002 | Eromaki | 455/575 |
| 2004/0157653 A1 * | 8/2004 | Kato | 455/575.4 |
| 2005/0176434 A1 | 8/2005 | White, Jr. | |
| 2006/0252471 A1 * | 11/2006 | Pan | 455/575.4 |

FOREIGN PATENT DOCUMENTS

| | | |
|---|---|---|
| EP | 1548544 A2 | 6/2005 |
| EP | 1542435 | 7/2005 |
| EP | 1585316 | 10/2005 |
| WO | 03021408 | 3/2003 |

OTHER PUBLICATIONS

Examination Report dated Jul. 17, 2008. In corresponding application No. 06117526.1.

\* cited by examiner

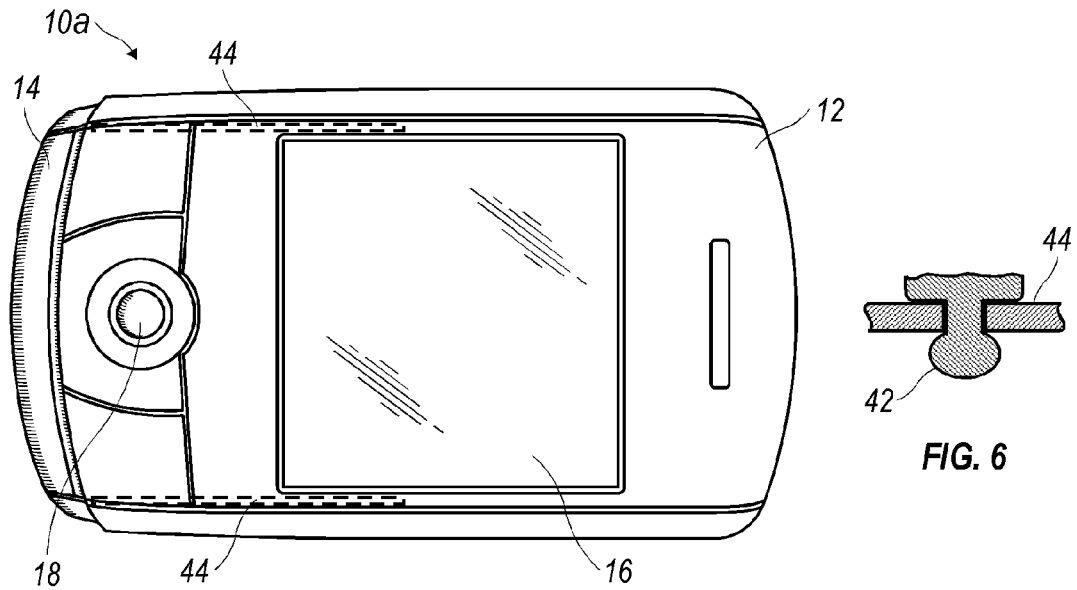
FIG. 5
FIG. 6
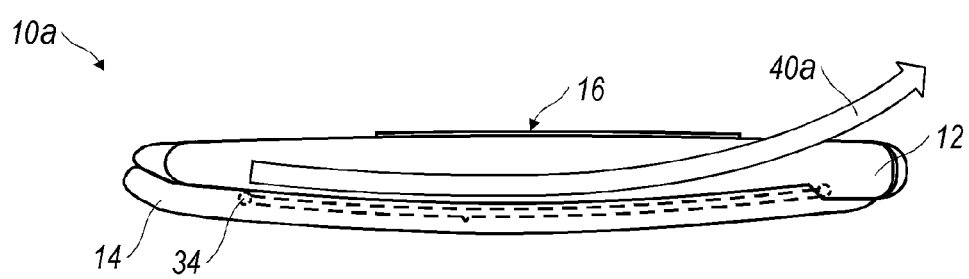
FIG. 7
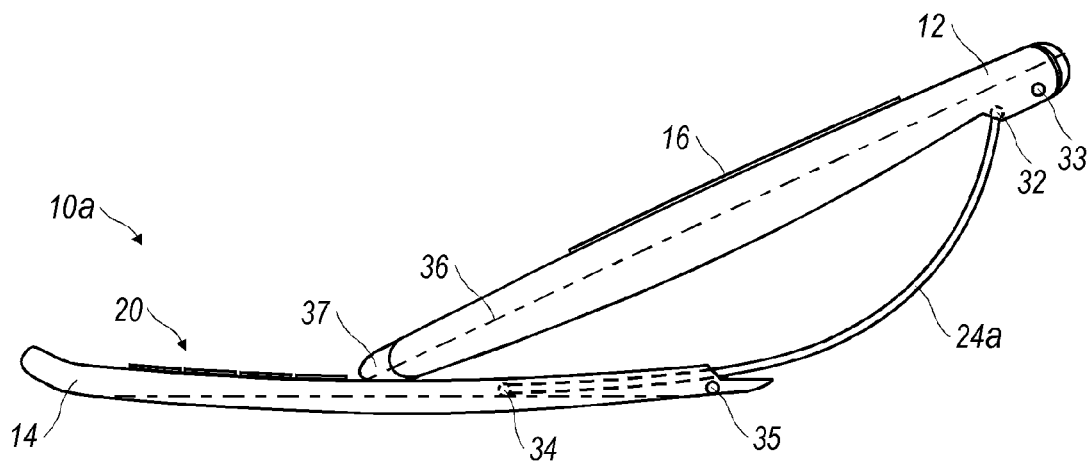
FIG. 8

HANDHELD MOBILE COMMUNICATION DEVICE WITH MOVEABLE DISPLAY/COVER MEMBER

CROSS-REFERENCE TO RELATED APPLICATIONS

This application is a continuation of U.S. application Ser. No. 11/458,453, filed on Jul. 19, 2006, now U.S. Pat. No. 7,690,576, which application is expressly incorporated by reference herein.

FIELD

The disclosure relates to handheld mobile communication devices. More particularly, the disclosure relates to handheld mobile communication devices of the sort in which a display member moves between a closed position, in which the display member covers at least some of the input keys of the device, and an open position, which exposes additional keys.

BACKGROUND

Handheld mobile communication devices have become well known in the art. In general, these devices now typically include a graphical display (e.g., an LCD screen) and a keypad—typically alphanumeric—by means of which a user enters information into the device. The devices further often include one or more navigation tools such as thumbwheels, trackballs, sensor touchpads, etc. by means of which, in combination with keypad entries, the user controls operation of the device. Some of the original (and even many current) handheld mobile communication devices were made with a "unibody" design, in which the display, keypad, and any navigation tools were attached to a common body member.

However, it is also common for the keypad to reside on one member ("the keypad member") and for the display to reside on a second member ("the display member") that is attached to and movable relative to the first member. This configuration allows the display member to be moved between an open position, in which additional features of the device are enabled including a keypad, and a closed position relative to the keypad member. Typically, the display member covers some or all of the keys on the keypad member when it is in the closed position, thereby preventing unintentional actuation of the keys on the keypad of the mobile communication device.

According to one known configuration of such a two-member construction, the display member overlies the keypad member and slides generally parallel to the keypad member to expose the keys. Thus, a flat overall configuration of the device is maintained. However, while this arrangement is not necessarily unsatisfactory, many users prefer the ergonomics of a device in which the display member is tilted upward toward them. An angle of approximately 155° between the keypad member and the display member, e.g., like that found on many current "clamshell," flip-open type cellular phones, has been found to be most desirable. While this fact, in turn, might suggest the general desirability of constructing all handheld mobile communication devices with a flip-open type configuration, the connection (hinge) between the display member and the keypad member has, in many cases, proven to be a weak point in the construction of such devices.

BRIEF DESCRIPTION OF THE DRAWINGS

Exemplary methods and arrangements conducted and configured according to the advantageous solutions presented herein are depicted in the accompanying drawings wherein:

FIG. 5 is a top view of a second embodiment of a handheld mobile communication device;

FIG. 6 is a section view of a guide track used in the device illustrated in FIG. 5;

FIGS. 7 and 8 are side views of the device shown in FIG. 5 in a closed configuration and an open configuration, respectively;

FIG. 17 illustrates an exemplary Dvorak keyboard layout;

FIG. 18 illustrates a QWERTY keyboard layout paired with a traditional ten-key keyboard;

FIG. 19 illustrates ten digits comprising the numerals 0-9 arranged as on a telephone keypad, including the * and # astride the zero;

FIG. 20 illustrates a numeric phone key arrangement according to the ITU Standard E.161 including both numerals and letters;

DETAILED DESCRIPTION

Figure 1:
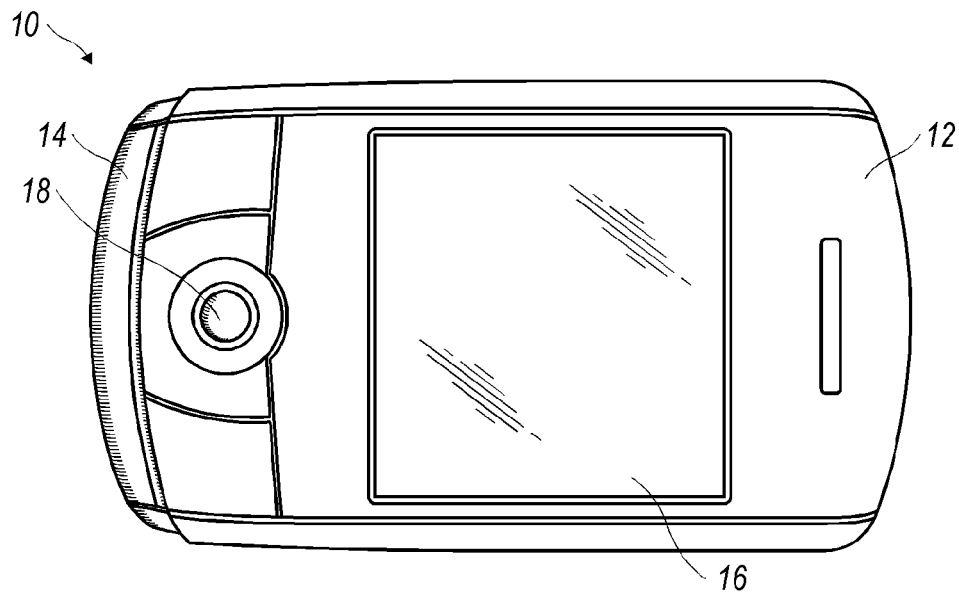
FIG. 1 is a top view of a first embodiment of a handheld mobile communication device.

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held. Therefore the size of the device must be kept relatively small; of its dimensions, limiting the width of the device is most important with respect to assuring cradleability in a user's hand. Moreover, it is preferred that the width of the device be maintained at less than ten centimeters (approximately four inches). Keeping the device within these dimensional limits provides a hand cradleable unit that users prefer for its useability and portability. Limitations with respect to the height (length) of the device are less stringent with importance placed on maintaining device hand-cradleablability. Therefore, in order to gain greater size, the device can be advantageously configured so that its height is greater than its width, but still remain easily supported and operated in one hand.

A potential problem is presented by the small size of the device in that there is limited exterior surface area for the inclusion of user input and device output features. This is especially true for the "prime real estate" of the front face of the device where it is most advantageous to include a display screen that outputs information to the user and which is preferably above a keyboard utilized for data entry into the device by the user. If the screen is provided below the keyboard, a problem occurs in being able to see the screen while inputting data. Therefore it is preferred that the display screen be above the input area, thereby solving the problem by assuring that the hands and fingers do not block the view of the screen during data entry periods.

To facilitate textual data entry, an alphabetic keyboard is provided. In one version, a full alphabetic keyboard is utilized in which there is one key per letter. This is preferred by some users because it can be arranged to resemble a standard keyboard with which they are most familiar. In this regard, the associated letters can be advantageously organized in QWERTY, QWERTZ or AZERTY layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith. This means that fewer keys can be included which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation; a problem the full keyboard avoids. Preferably, this character discrimination is accomplished utilizing disambiguation software accommodated within the device. As with the other software programs embodied within the device, a memory and microprocessor are provided within the body of the handheld unit for receiving, storing, processing, and outputting data during use. Therefore, the problem of needing a textual data input means is solved by the provision of either a full or reduced alphabetic keyboard on the presently disclosed handheld electronic device.

Keys, typically of a push-button or push-pad nature, perform well as data entry devices but present problems to the user when they must also be used to affect navigational control over a screen-cursor. In order to solve this problem the present handheld electronic device preferably includes an auxiliary input that acts as a cursor navigational tool and which is also exteriorly located upon the front face of the device. Its front face location is particularly advantageous because it makes the tool easily thumb-actuable like the keys of the keyboard. A particularly usable embodiment provides the navigational tool in the form of a trackball which is easily utilized to instruct two-dimensional screen cursor movement in substantially any direction, as well as act as an actuator when the ball of the trackball is depressible like a button. The placement of the trackball is preferably above the keyboard and below the display screen; here, it avoids interference during keyboarding and does not block the user's view of the display screen during use.

In some configurations, the handheld electronic device may be standalone in that it is not connectable to the "outside world." One example would be a PDA that stores such things as calendars and contact information, but is not capable of synchronizing or communicating with other devices. In most situations such isolation will be detrimentally viewed in that at least synchronization is a highly desired characteristic of handheld devices today. Moreover, the utility of the device is significantly enhanced when connectable within a system, and particularly when connectable on a wireless basis in a system in which both voice and text messaging are accommodated.

Handheld mobile communication devices, variously configured as described above, according to this disclosure have a closed configuration, in which the display member of the device covers at least a portion of the keys on the keypad member of the device, and an open configuration, in which the keys are accessible. When the display member is in its open position, it forms an ergonomically desirable angle that is greater than 90° and less than 180° relative to the keypad member, i.e., an angle on the order of about 100° to about 170°, with about 155° being preferred. However, unlike clamshell-type cellular phones, the display member does not simply flip open about a conventional pivot joint. Rather, it moves from its closed position, where it is parallel and adjacent to the keypad member, to its open, angled position in a number of ways including: through a sliding/sweeping motion; through an eccentric, "up-and-over" rotational motion; and through a combination sliding/"up-and-over" motion. With either of these motions, the graphical display remains exposed to the user.

The ergonomic angle is desirable in many different cases. Where the handheld mobile communication device is configured as a cellular phone with an earpiece or earspeaker on the display member and a microphone on the keypad member, the angle replicates the curvature of a user's jaw and allows the device to be held close to the user's head for speaking comfort. Where, on the other hand, the device is configured as an email communication device, the angle allows the user to hold the device at an angle that is comfortable for the hands and wrists and view the device at an angle that is comfortable for the eyes. Many (if not most) handheld mobile communication devices now include both features—phone and email capabilities—and therefore the benefits for both applications apply.

A first embodiment 10 of a handheld mobile communication device is illustrated in FIGS. 1-4. The device 10 includes a display member 12 and a keypad member 14. Display member 12 includes a display 16, e.g., an LCD display, and, in the illustrated embodiment, a navigation tool 18, e.g., a trackball. Keypad member 14, on the other hand, includes an alphanumeric keypad 20, which includes keys for each of the letters A-Z of the English alphabet as well as the digits 0-9. The keypad 20 may include the letters on a one-letter-per-key basis or, as illustrated, on a reduced-key basis, as known in the art. Furthermore, the letters are preferably arranged in a QWERTY, QWERTZ, AZERTY, or Dvorak arrangement, as is known in the art, and the digits 0-9 may be arranged in customary touch-tone telephone keypad format.

Figure 2:
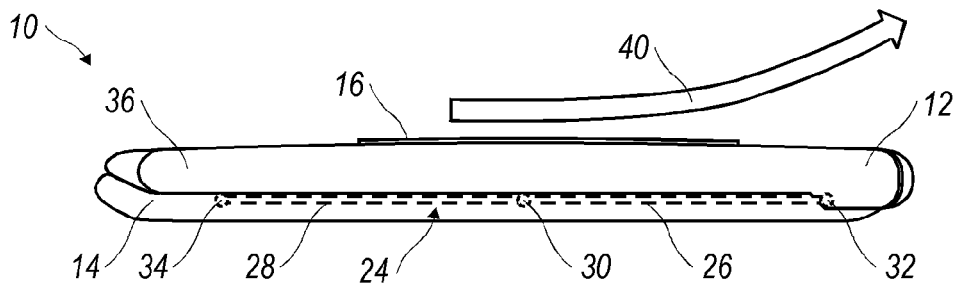
FIG. 2 is a side view of the handheld mobile communication device shown in FIG. 1 in a closed configuration.
Figure 3:
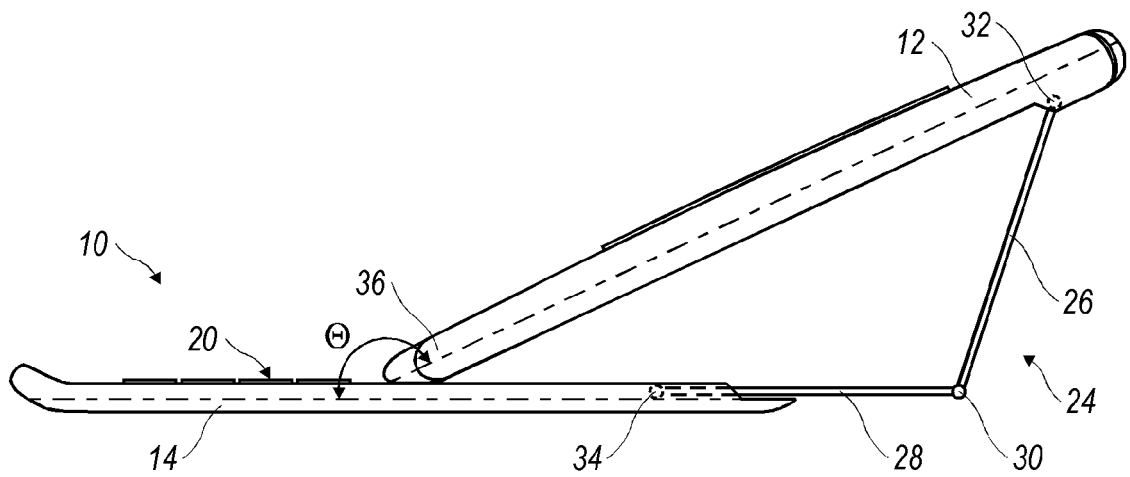
FIGS. 3 and 4 are a side view and a perspective view, respectively, of the device shown in FIGS. 1 and 2, but in an open configuration.
Figure 4:
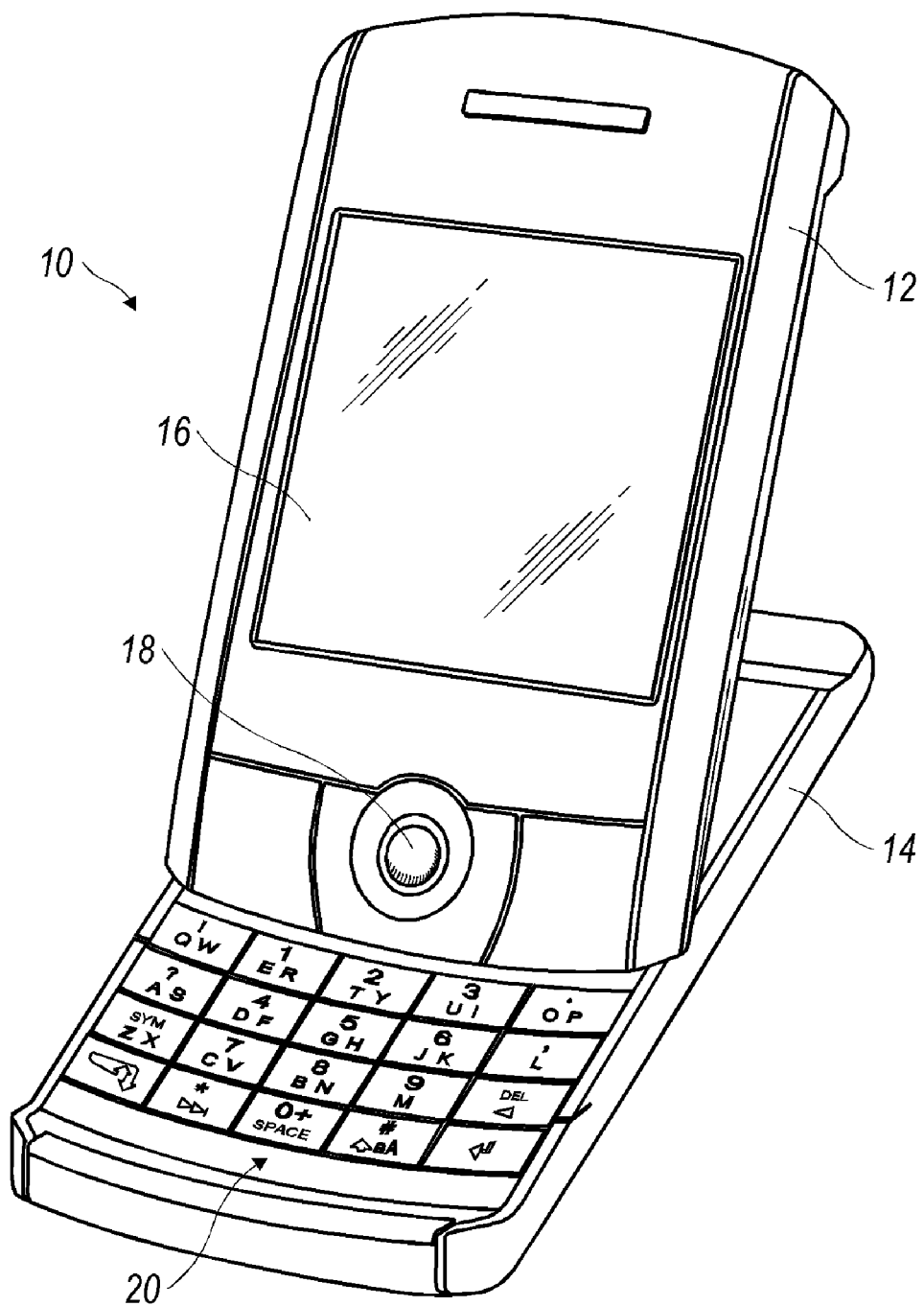
Figure 4A:
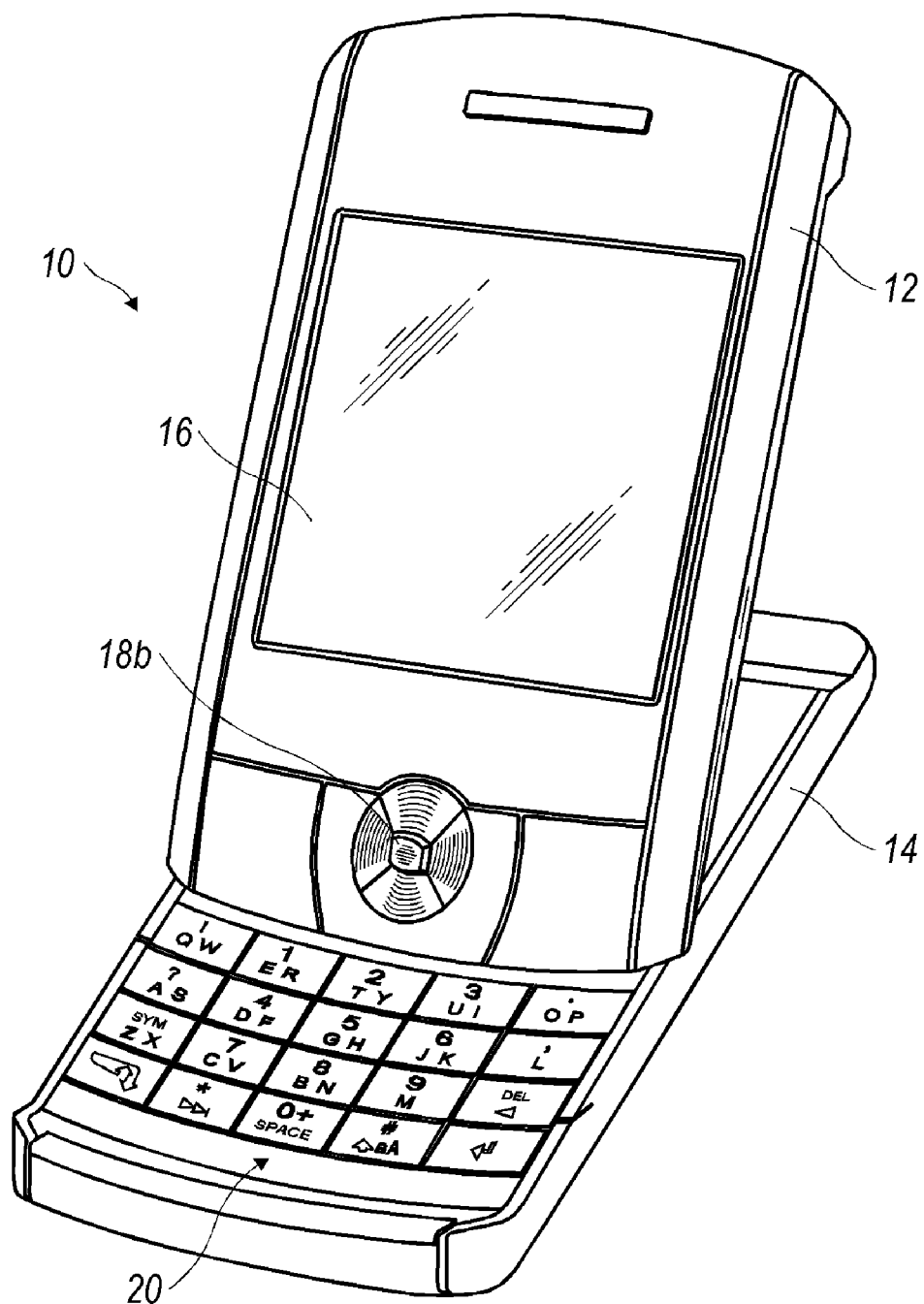
FIG. 4a is an isometric view of a handheld mobile communication device including a navigation controller assembly comprising cursor keys.
Figure 4B:
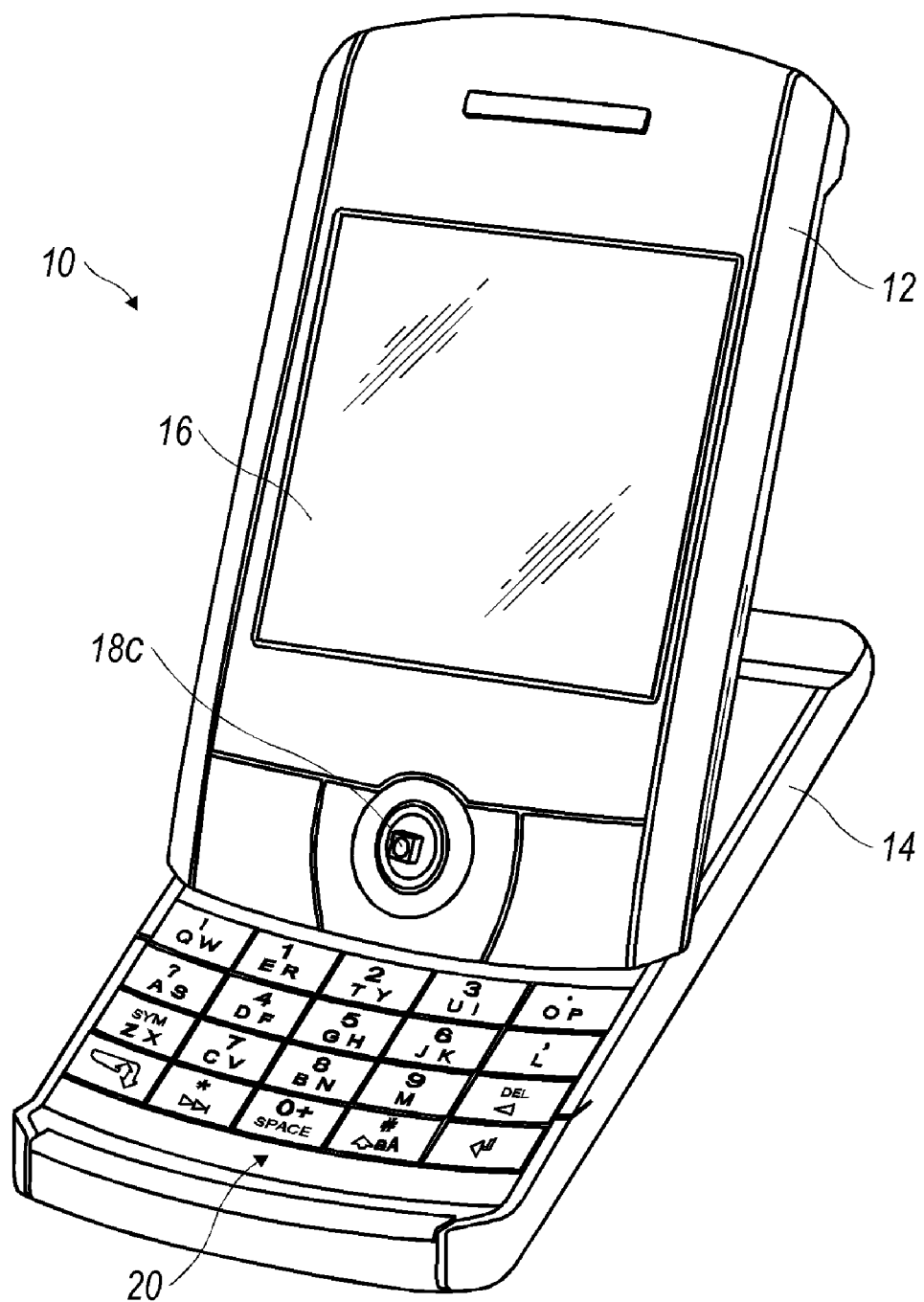
FIG. 4b is an isometric view of a handheld mobile communication device including a navigation controller assembly comprising a joystick.
Figure 4C:
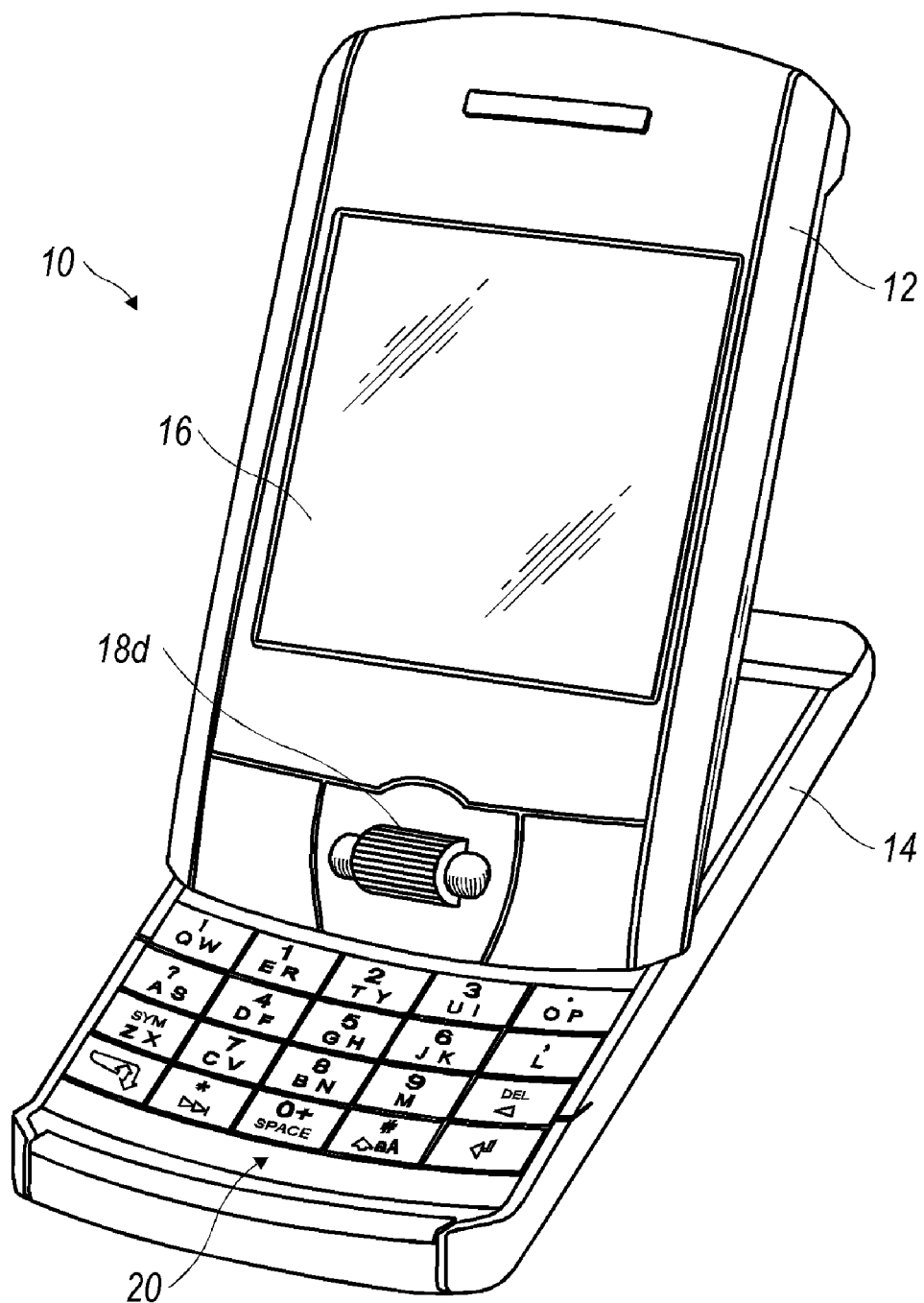
FIG. 4c is an isometric view of a handheld mobile communication device including a navigation controller assembly comprising a barrel roller.
Figure 4D:
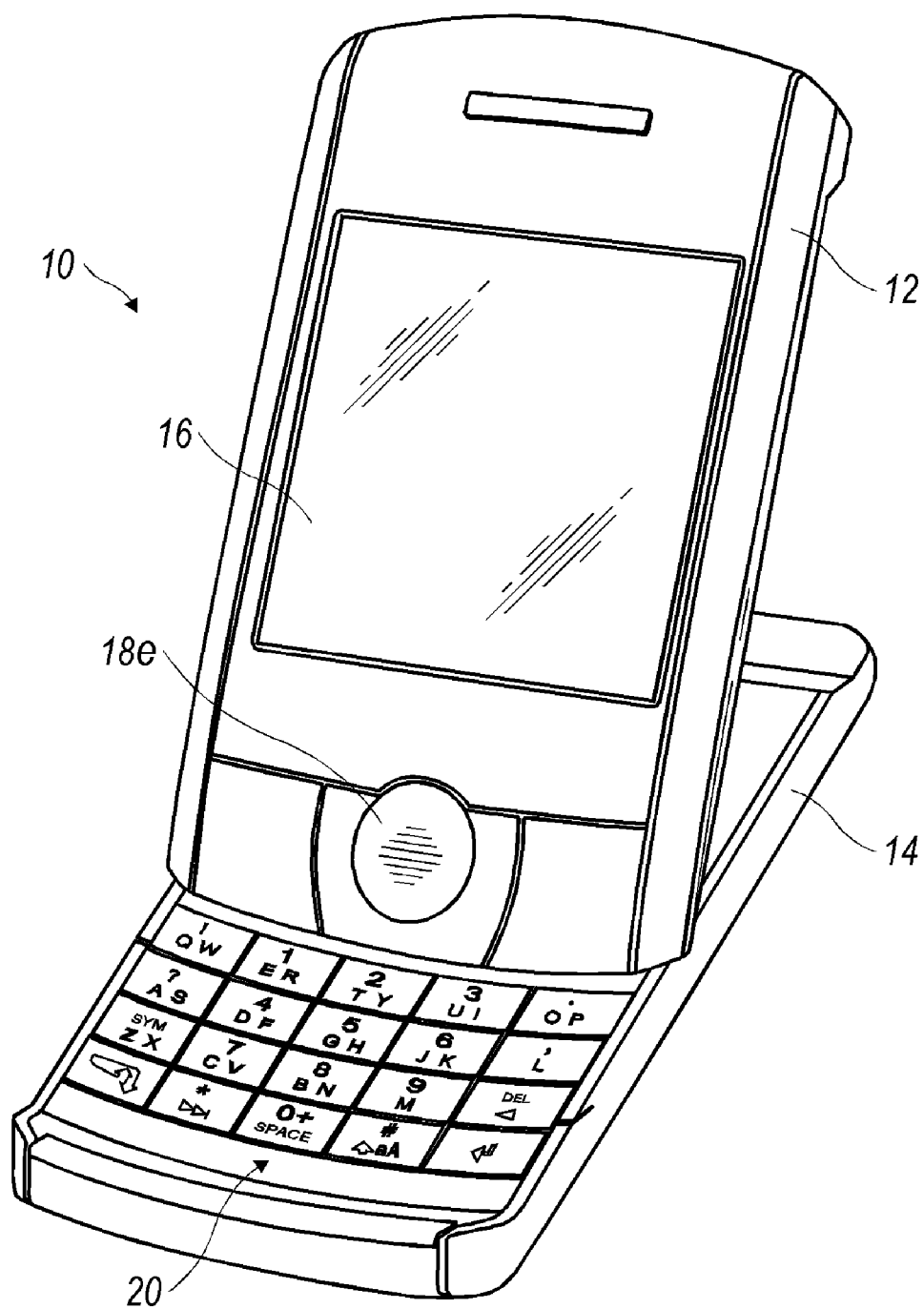
FIG. 4d is an isometric view of a handheld mobile communication device including a navigation controller assembly comprising a touchpad.

As illustrated in FIGS. 2 and 3, the device 10 includes a linkage assembly 24 that interconnects the display member 12 and keypad member 14 and that helps guide the display member 12 between the closed position (FIGS. 1 and 2) and the open position (FIGS. 3 and 4). The linkage assembly 24 is a two-piece member including upper and lower "struts" 26, 28 that are pivotally connected to each other at pivot joint 30, located approximately at the mid-point of the linkage assembly 24. At its opposite end, upper strut 26 is pivotally attached to the display member 12, e.g., by means of a pin coupling 32 at a rear portion of the display member. The lower strut member 28 fits within a slot or pocket (not shown) formed in the keypad member 12, beneath the keypad 20, and a pivot pin 34 slidingly couples the lower end of the lower strut member 28 to the sidewalls of the slot or pocket. A stop (not illustrated) limits sliding motion of the pivot pin 34 to the right as oriented in FIG. 2. Furthermore, the front end 36 of the display member 12 is pivotally and slidingly coupled to the keypad member 14, e.g., by means of pins-in-slot sliding coupling.

The configuration of the device 10 allows it to be opened to expose the keypad 20 with a two-part sliding, sweeping motion, as represented by the arrow 40 in FIG. 2. In particular, the display member 12 is first slid to the right (as oriented in FIG. 2), parallel to the keypad member 14, until the pivot joint 30 of the linkage assembly 24 clears the end of the slot or pocket. At that point, the display member 12 can start to be tilted upward, toward the user. In the illustrated embodiment, the linkage assembly 24 can be extended even further out of the slot or pocket (until the pin 34 reaches the stop), which allows the display member 12 to continue moving translationally while at the same time pivoting upwardly. This imparts a sweeping motion to the display member 12 during the second part of the opening motion. Alternatively, if the parallel sliding portion of the opening motion is limited to just that amount of sliding necessary for the pivot joint 30 to clear the slot or pocket, pivoting the display member 12 upward will cause its bottom end 36 to slide back toward the user slightly.

Regardless of the precise kinematics, however, the final, open configuration of the device 10 preferably has the display member 12 tilted upward relative to the keypad member 14 such that there is an included angle Θ of about 155° between the display 16 and the keypad 20. While the angle Θ is preferably 155°, the included angle is greater than 90° and less than 180°. The display member 12 is then held in that position by any of a variety of means. For example, there may be a "divot" in the sidewalls of the slot or pocket into which the pin 34 fits. Alternatively, the coupling between the lower end 36 of the display member 12 and the keypad member 14 may provide sufficient friction for the display member 12 to remain at the desired angle relative to the keypad member 14. Still further, the linkage assembly 24 may be biased toward the open configuration shown in FIG. 2, e.g., by means of a small coil spring surrounding the pivot joint 30.

After use, the display member 12 is returned to the closed position (FIG. 2), to again cover the keypad 20, by moving it in the reverse direction.

A similar embodiment 10*a* of a handheld mobile device is illustrated in FIGS. 5-8. Components that are the same as in the embodiment 10 illustrated in FIGS. 1-4 are labeled the same in FIGS. 5-8. The primary difference between the embodiments 10 and 10*a* is that the linkage "assembly" 24*a* in the embodiment 10*a* is formed from a single piece of flexible material (e.g., spring steel) which may bias the device toward the open-device configuration as shown in FIGS. 7 and 8. Such a configuration would automatically hold the device in the open configuration and would avoid the need for friction fitment, detents, divots, etc. As reflected by arrow 40*a*, the opening and closing kinematics of the device 10*a* are generally the same as for the device 10.

The pre-curved, single-piece construction of the linkage assembly 24*a* allows the device 10*a* to be configured for self-closing operation. In particular, a retraction mechanism (not illustrated), e.g., a spring, may be provided extending from a connection point 33 on the display member 12 to a connection point 35 on the keypad member 14. By appropriately selecting the relative levels of resiliency of the linkage assembly 24*a* and the retraction mechanism (e.g., by appropriately selecting relative spring constants), the retraction mechanism can be made to pull the display member 12 from the open position shown in FIG. 8 back to the closed position shown in FIG. 7.

It should be appreciated that, if the device 10*a* is so configured for self-closing operation, means to hold the device 10*a* in the open configuration shown in FIG. 8 needs to be provided. Such means could be as simple as a detent mechanism, e.g., a bump or protrusion (not illustrated) extending laterally outward from the lower end 37 of the display member 12 that drops down into a notch (not illustrated) formed in the keypad member 20 when the display member 12 is slid out to the fully open position. Other means for retaining the device 10*a* in the open configuration will, of course, readily occur to those having skill in the art.

Finally, with respect to the embodiment 10*a*, it is preferable to guide the opening and closing motion of the display member 12 relative to the keypad member 14. Protrusion 42 (FIG. 6) formed on the side of the display member 12 slides within track 44 formed along the sides of the keypad member 14.

Figure 9:
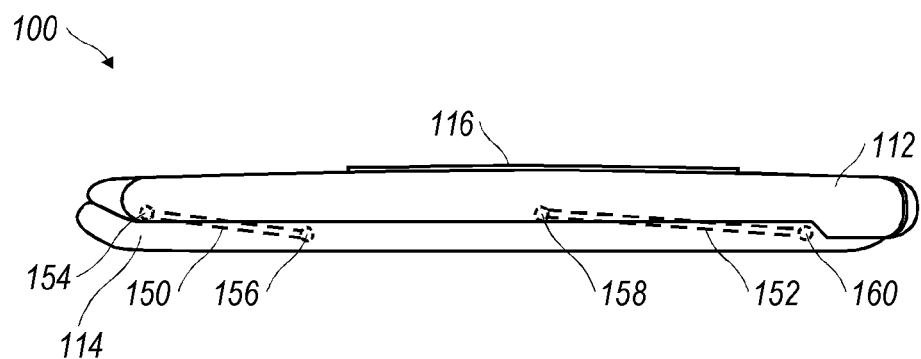
FIGS. 9 and 10 are side views of a third embodiment of a mobile handheld communication device in a closed configuration and an open configuration, respectively.
Figure 10:
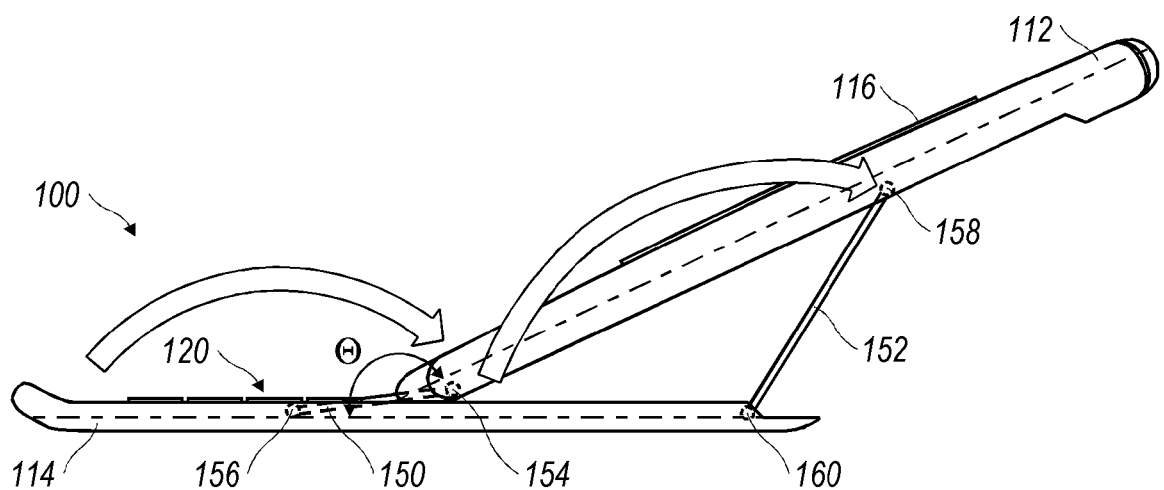

Another embodiment 100 of a handheld mobile communication device is illustrated in FIGS. 9 and 10. The device 100 has similar basic components as the devices 10 and 10*a*, namely, a display member 112 and a keypad member 114, with a display 116 and a keypad 120, respectively.

Unlike the devices 10 and 10*a*, however, the device 100 is configured such that the display member 112 moves somewhat eccentrically rotationally/pivotally into the open position shown in FIG. 10. In particular, the device 100 includes rigid front and rear linkage bars 150 and 152, respectively. Front linkage bar 150 is pivotally connected (e.g., pinned) to the display member 112 at pin connection 154 at the front of the display member 112 and to the keypad member 114 at pin connection 156 at the front of the keypad member. Similarly, rear linkage bar 152 is pivotally connected (e.g., pinned) to the display member 112 at pin connection 158 at a mid-portion (not necessarily the exact center) of the display member 112 and to the keypad member 114 at pin connection 160 at a mid-portion (not necessarily the exact center) of the keypad member 114. The front linkage bar 150 is shorter than the rear linkage bar; therefore, the front end of the display member 112 pivots relative to the front pin connection 156 with a pivot radius that is smaller than the pivot radius with which the point at which the rear linkage bar is connected to the display member 112 pivots relative to the rear pin connection 160. Accordingly, the front end of the display member 112 is able to pivot "up and over" from a first position adjacent to the keypad member 114 (FIG. 9) to a second position adjacent to the keypad member (FIG. 10) before the mid-portion of the display member 112 is able to pivot from being adjacent to the keypad member (FIG. 9) over to another position where it would again be adjacent to the keypad member 114. Therefore, the parallel relation between the display member 112 and the keypad member 114 that exists in the closed position (FIG. 9) is not maintained as the display member 112 moves into the open position (FIG. 10). As a result, the ergonomically desired angle (e.g., 155°) is obtained through the eccentric, "up-and-over" motion of the display member 112 relative to the keypad member 114.

The "up-and-over" motion of the display member 112 is particularly advantageous, as it allows the front end of the display member 112 to travel in a path which clears the raised keys of the keypad 120. This, in turn, enables making the keys taller, which is preferred since it allows the user to find and depress the correct key with greater assurance.

Figure 11:
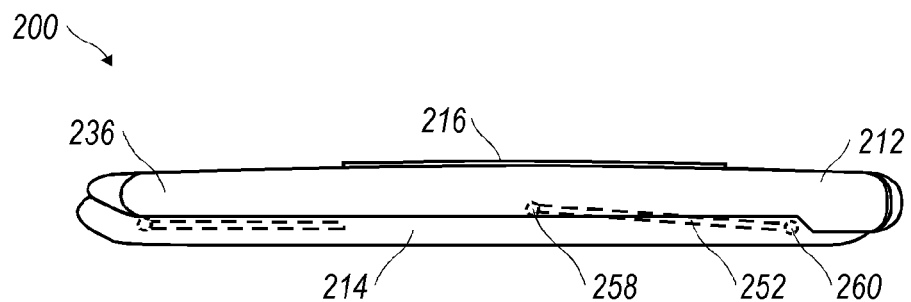
FIGS. 11 and 12 are side views of a third embodiment of a mobile handheld communication device in a closed configuration and an open configuration, respectively.
Figure 12:
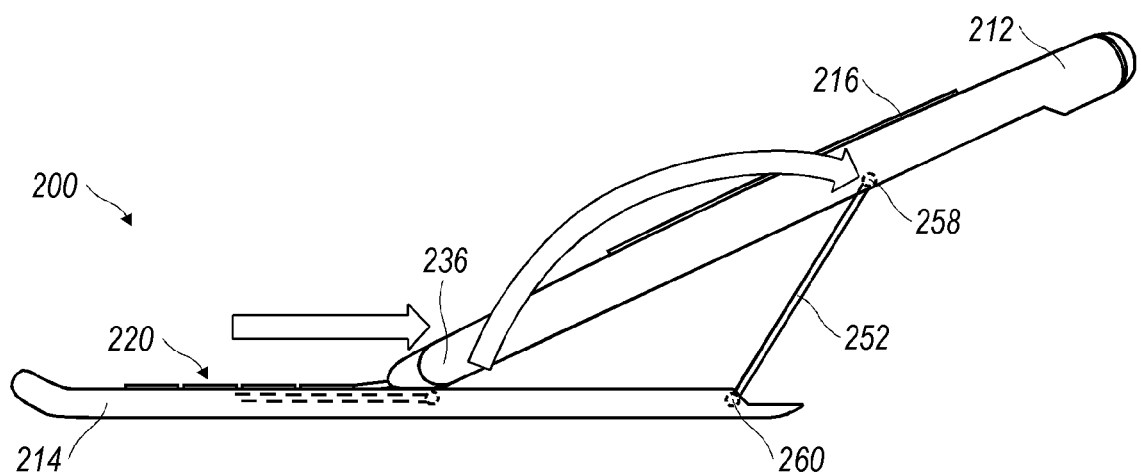

Yet another embodiment 200 of a handheld mobile communication device is illustrated in FIGS. 11 and 12 in a closed configuration and in an open configuration, respectively. The embodiment 200 incorporates kinematic features of both embodiments 10 (10a) and 100, in a "hybrid" version thereof.

In particular, like the embodiments described above, the device 200 includes a display member 212 and a keypad member 214 with a display 216 and a keypad 220, respectively. Like the embodiment 10 and 10a, the front end 236 of the display member 212 is pivotally and slidingly coupled to the keypad member 214. Like the embodiment 100, on the other hand, the approximate "midpoint" of the display member 212 is coupled to the keypad member 214 by means of a rigid linkage bar 252, which is pivotally connected to the display member 212 at pin connection 258 and to the keypad member 214 at pin connection 260. With this configuration, the display member 212 is moved to the open position by sliding the front end 236 of the display member 212, as per the first two embodiments 10 and 10a described above, while pivoting the mid portion of the display member 212 up-and-over via the rear linkage bar 252, as per the third embodiment 100 described above.

Figure 26:
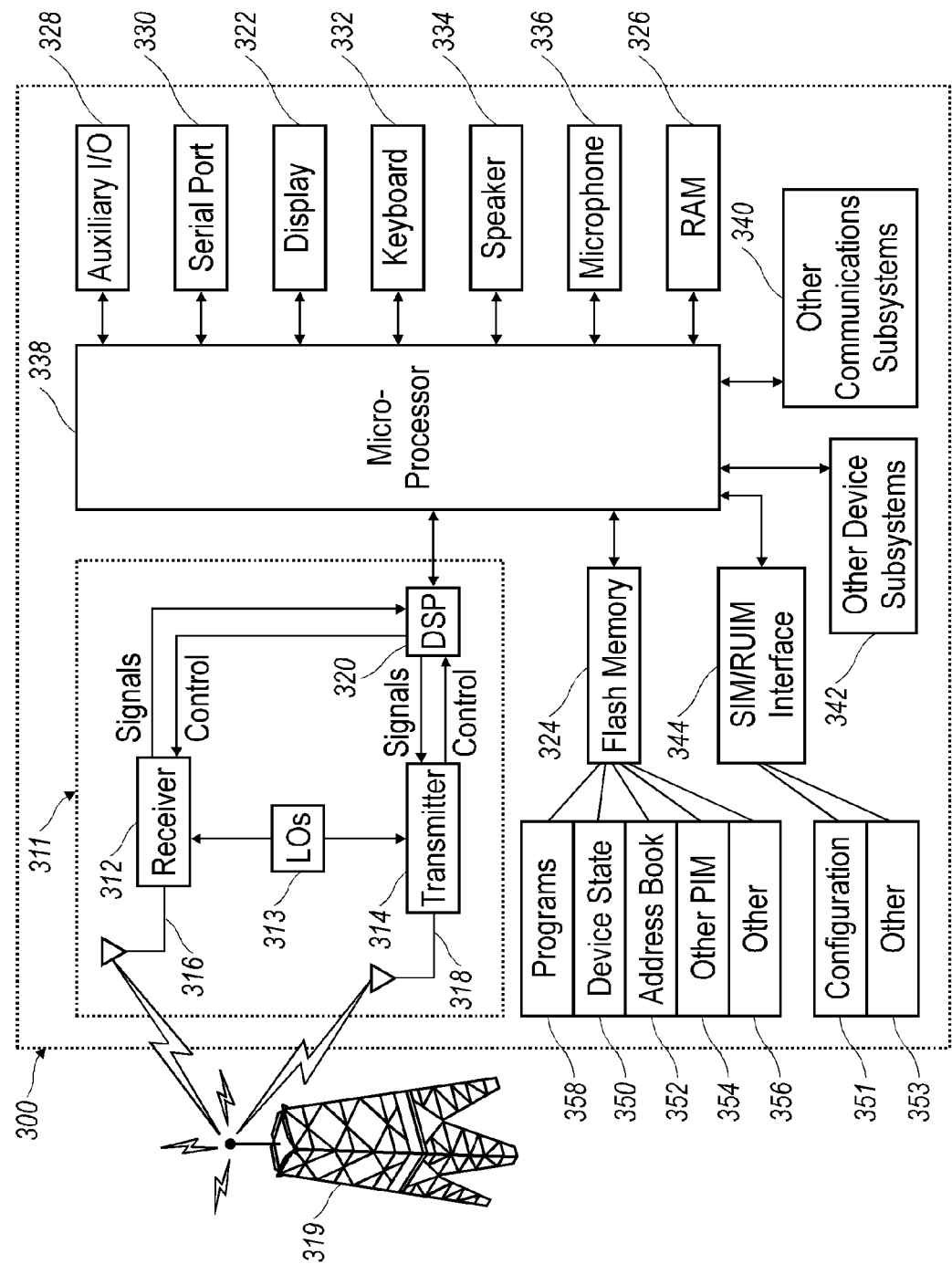
FIG. 26 is a block diagram representing a wireless handheld communication device interacting in a communication network.

As depicted in FIG. 26, the handheld communication device 300 transmits data to, and receives data from a communication network 319 utilizing radio frequency signals, the details of which are discussed more fully hereinbelow. Preferably, the data transmitted between the handheld communication device 300 and the communication network 319 supports voice and textual messaging, though it is contemplated that the method for producing audible sound is equally applicable to single mode devices; i.e. voice-only devices and text-only devices.

As may be appreciated from FIG. 4, the handheld mobile communication device 10 comprises a lighted display 16 located above a keyboard 20 suitable for accommodating textual input to the handheld mobile communication device 10 when in an operable configuration. Preferably, the screen 16 and keyboard 20 are located at the front face of the handheld mobile communication device 10.

Figure 21:
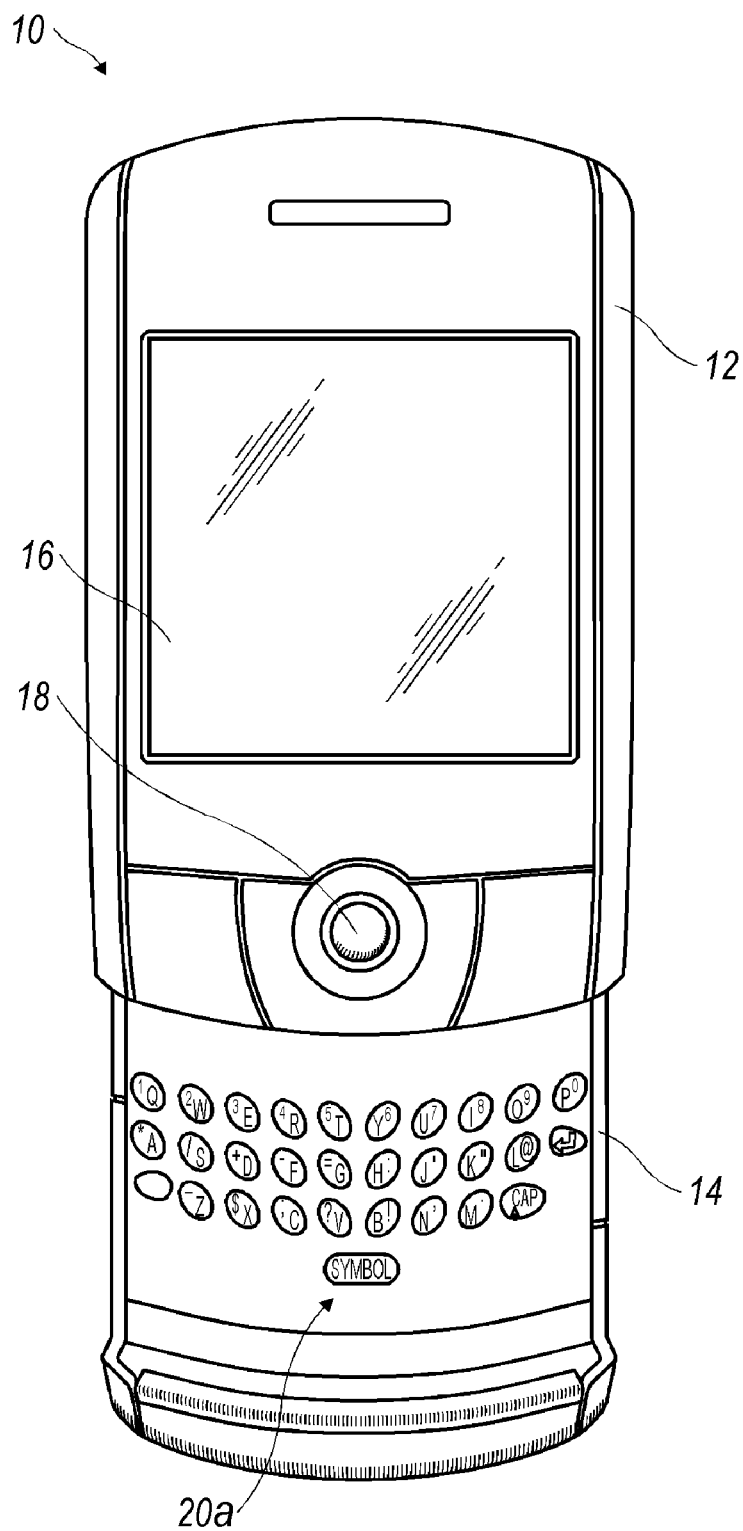
FIG. 21 is a front view of an exemplary handheld mobile communication device including a full QWERTY keyboard.
Figure 22:
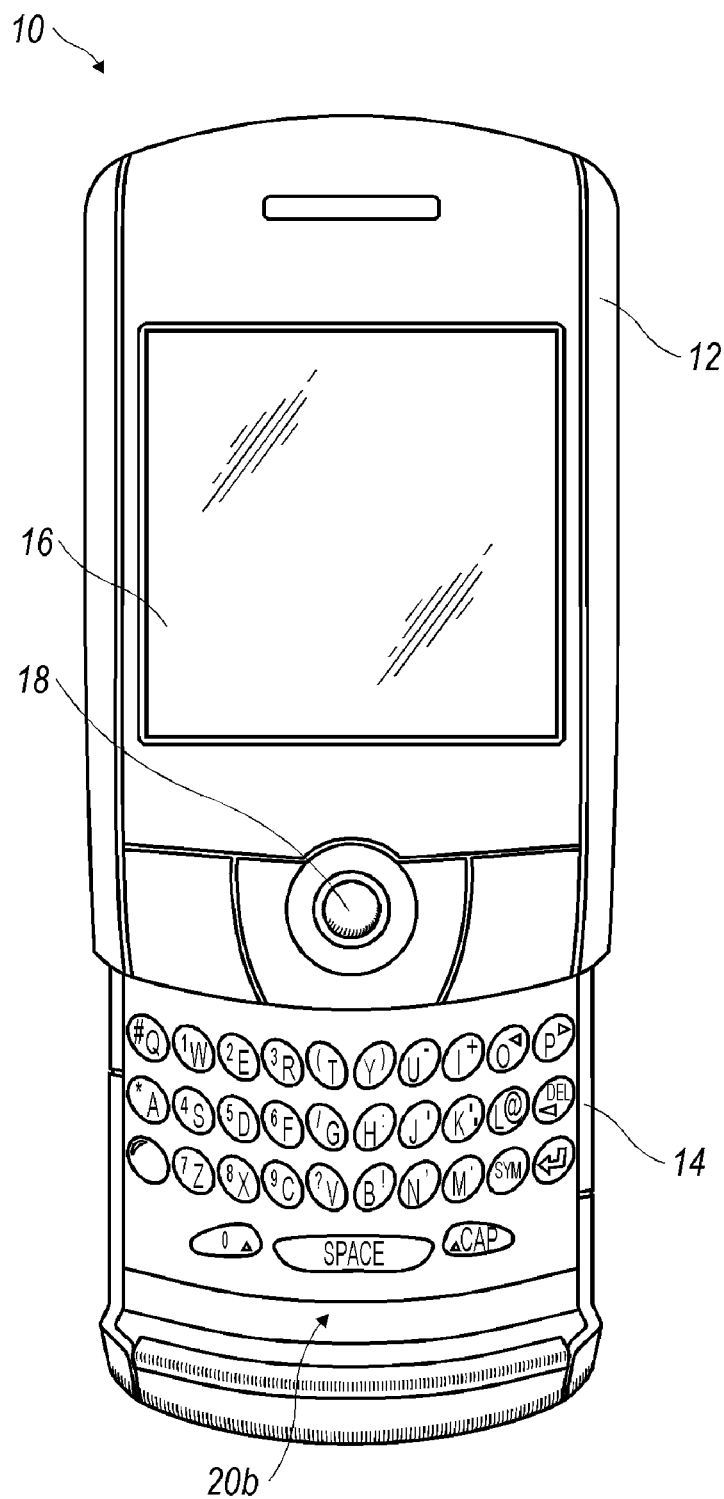
FIG. 22 is a front view of another exemplary handheld mobile communication device including a full QWERTY keyboard.

In one embodiment, the keyboard 20a, 20b comprises a plurality of keys with which alphabetic letters are associated on a one letter per key basis. It is contemplated that the keys may be directly marked with letters, or the letters may be presented adjacent, but clearly in association with a particular key. This one-to-one pairing between the letters and keys is depicted in FIGS. 21 and 22 and is described in greater detail below in association therewith. In order to facilitate user input, the alphabetic letters are preferably configured in a familiar QWERTY, QWERTZ, AZERTY, or Dvorak layout, each of which is also discussed in greater detail hereinbelow.

In the alternative embodiment of FIG. 4, the keyboard 20 comprises a plurality of keys with which alphabetic letters are also associated, but at least a portion of the individual keys have multiple letters associated therewith. This type of configuration is referred to as a reduced keyboard (in comparison to the full keyboard described immediately above) and can, among others come in QWERTY, QWERTZ, AZERTY, and Dvorak layouts.

As depicted in FIG. 4, the auxiliary user input is a trackball 18. Motion of the trackball 18 is assessed using a plurality of sensors 420, 422, 424, 426 that quantify rotational motion of the trackball 18 about an intersecting x-axis 412 and an intersecting y-axis 414 of the trackball (see FIG. 13).

In one embodiment, the plurality of sensors 420, 422 number two. One of the two sensors 422 outputs signals indicative of x-component rolling motion of the trackball 18 relative to the handheld communication device 10 and about the intersecting y-axis 414 of the trackball (see the rotational arrows about the y-axis in FIG. 13). The other of the two sensors 420 outputs signals indicative of y-component rolling motion of the trackball 18 relative to the handheld communication device 10 and about the intersecting x-axis 414 of the trackball (see the rotational arrows about the x-axis in FIG. 13). In this configuration, the two sensors 420, 422 are oriented radially about the trackball 18 with approximately ninety degree spacing therebetween. In one embodiment, each of the sensors is a hall effect sensor located proximate the trackball.

Figure 13:
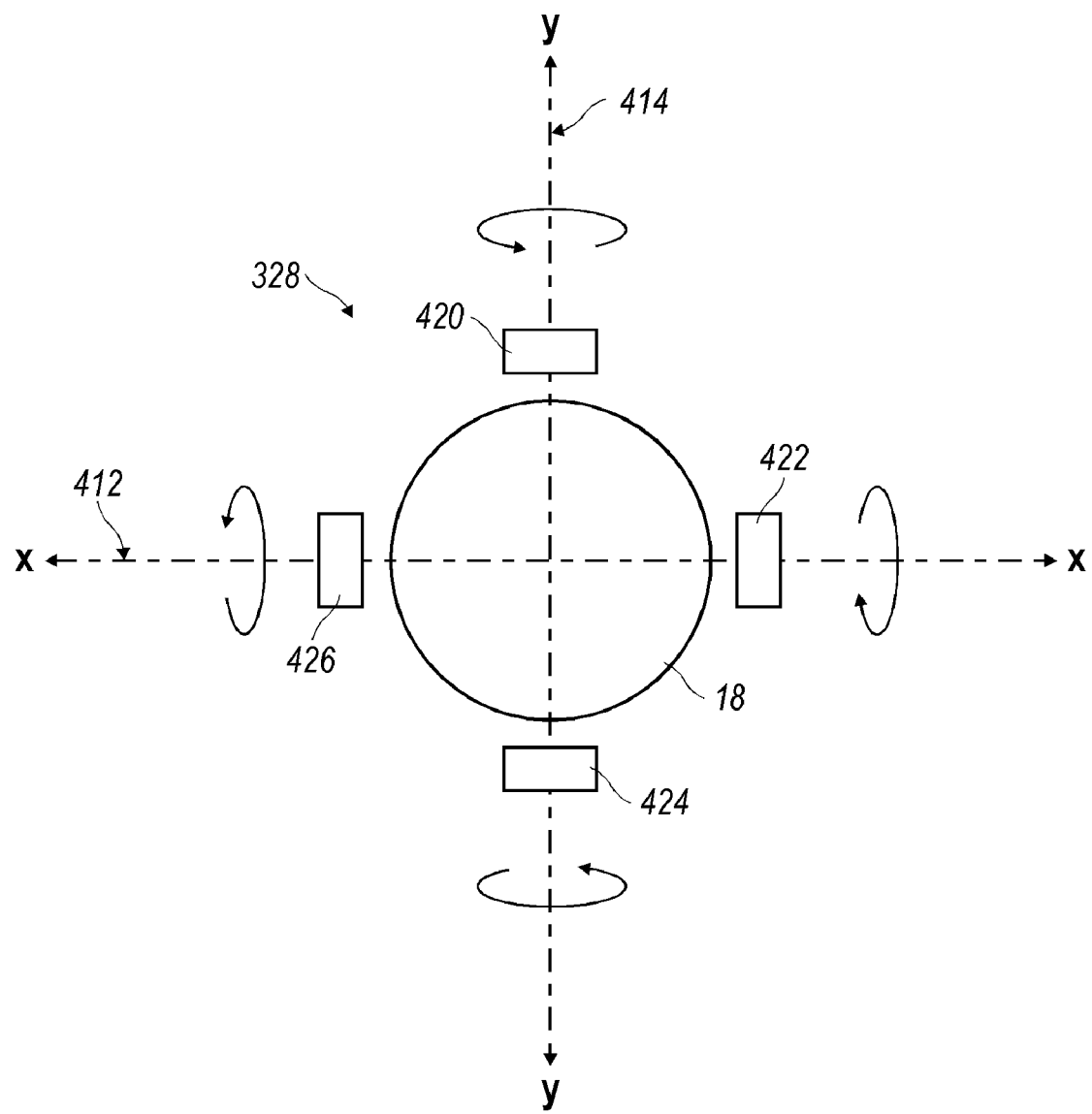
FIG. 13 is a schematic representation of an auxiliary input in the form of a trackball.

In another embodiment, the plurality of sensors 420, 422, 424, 426 number four. A first pair of opposed sensors 422, 426 outputs signals indicative of x-component rolling motion of the trackball 18 relative to the handheld communication device 10 and about the intersecting y-axis 424. A second pair of opposed sensors 420, 424 outputs signals indicative of a y-component rolling motion of the trackball 18 relative to the handheld communication device 10 and about the intersecting x-axis 412. The four sensors 420, 422, 424, 426 are oriented radially about the trackball 18 with approximately ninety degree spacing between consecutive sensors as depicted in FIG. 13.

Each produced x-direction signal represents a discrete amount of x-component (incremental x-direction) rolling motion of the trackball 18 relative to the handheld communication device 10 while each produced y-direction signal represents a discrete amount of y-component (incremental y-direction) rolling motion of the trackball 18 relative to the handheld communication device 10.

In a preferred embodiment, the predetermined criterion for discriminating user indicated x-direction cursor movement is identification of a threshold number of x-direction signals in a predetermined signal sample. For example, out of a moving-window sample of 10 consecutive signals, six or more must be x-signals in order to be indicative of desired x-direction cursor movement. Likewise, the predetermined criterion for discriminating user indicated y-direction cursor movement is identification of a threshold number of y-direction signals in a predetermined signal sample. The same sampling example holds, but applied to y-signals instead of x-signals. In a similar respect, the predetermined criterion for discriminating user indicated diagonal cursor movement is identification of a threshold number of x-direction signals and a threshold number of y-direction signals in a predetermined signal sample. For instance, out of a moving-window sample of 10 consecutive signals, four or more must be x-signals and four or more must be y-signals in order to be indicative of desired diagonal cursor movement.

While the navigation tool is described above as a trackball 18, the navigation tool for the handheld communication device is preferably selected from the group of trackball 18, 4-way cursor 18b, joystick 18c, roller barrel 18d, and touch pad 18e as shown in FIGS. 4a-4d. These devices are also considered auxiliary input devices.

Further aspects of the environments, devices and methods of employment described hereinabove are expanded upon in the following details. An exemplary embodiment of the handheld mobile communication device 10 as shown in FIG. 4 is cradleable in the palm of a user's hand. The size of the device 10 is such that a user is capable of operating the device using the same hand that is holding the device. In a preferred embodiment, the user is capable of actuating all features of the device 10 using the thumb of the cradling hand. The preferred embodiment of the handheld device 10 features a keyboard 20, which is actuable by the thumb of the hand cradling the device 10. The user may also hold the device 10 in such a manner to enable two thumb typing on the device 10. Furthermore, the user may use fingers rather than thumbs to actuate the keys on the device 10.

The handheld mobile communication device 10 includes an input portion and an output display portion. The output display portion can be a display screen 16, such as an LCD or other similar display device.

The input portion includes a plurality of keys that can be of a physical nature such as actuable buttons or they can be of a software nature, typically constituted by virtual representations of physical keys on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

In the case of software keys, the indicia for the respective keys are shown on the display screen, which in one embodiment is enabled by touching the display screen, for example, with a stylus to generate the character or activate the indicated command or function. Such display screens may include one or more touch interfaces, including a touchscreen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld mobile communication device is shown on the display screen in the same configuration as the physical keys. Thus, the desired character, command or function is obtained by depressing the physical key corresponding to the character, command or function displayed at a corresponding position on the display screen, rather than touching the display screen. To aid the user, indicia for the characters, commands and/or functions most frequently used are preferably positioned on the physical keys and/or on the area around or between the physical keys. In this manner, the user can more readily associate the correct physical key with the character, command or function displayed on the display screen.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations of the English-language alphabet.

Figure 14:
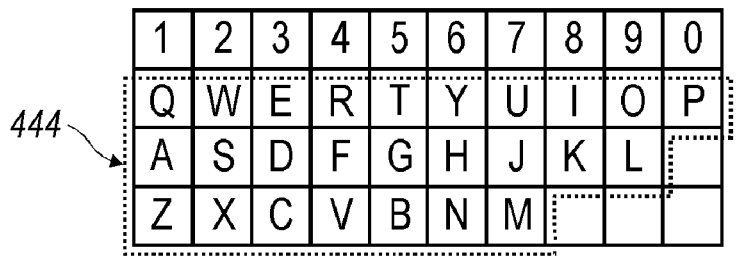
FIG. 14 illustrates an exemplary QWERTY keyboard layout.

The QWERTY keyboard layout is the standard English-language alphabetic key arrangement 444 (see FIG. 14). In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878, U.S. Pat. No. 207,559.

Figure 15:
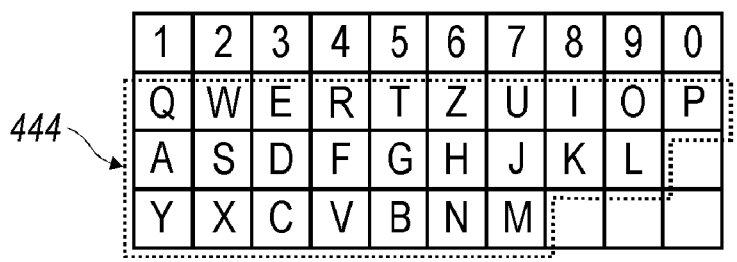
FIG. 15 illustrates an exemplary QWERTZ keyboard layout.

The QWERTZ keyboard layout is normally used in German-speaking regions. This alphabetic key arrangement 444 is shown in FIG. 15. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

Figure 16:
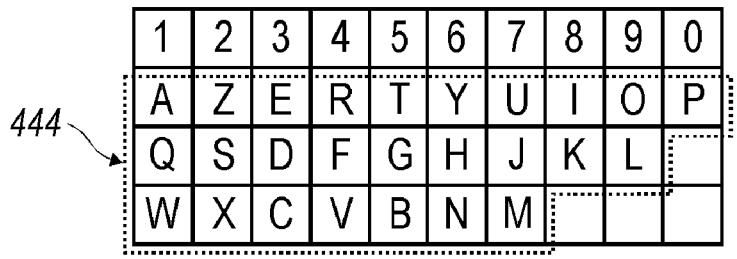
FIG. 16 illustrates an exemplary AZERTY keyboard layout.

The AZERTY keyboard layout is normally used in French-speaking regions. This alphabetic key arrangement 444 is shown in FIG. 16. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Figures 17, 18, 19, 20:
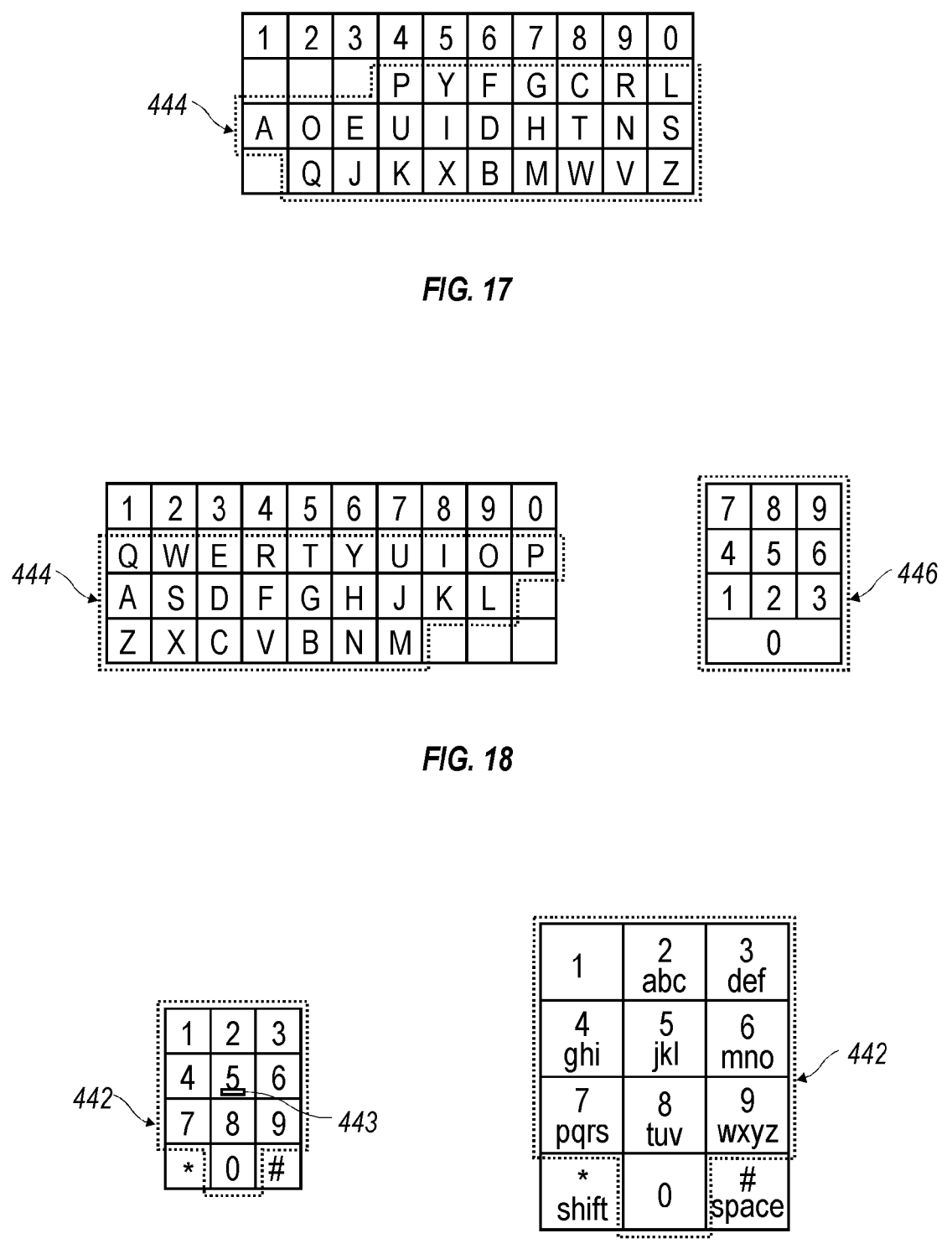

The Dvorak keyboard layout was designed in the 1930s by August Dvorak and William Dealey. This alphabetic key arrangement 444 is shown in FIG. 17. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. An exemplary numeric key arrangement is shown in FIGS. 14-17 where the numbers 1-9 and 0 are positioned above the alphabetic keys. In another numeric key arrangement, numbers share keys with the alphabetic characters, such as the top row of the QWERTY keyboard. Yet another exemplary numeric key arrangement is shown in FIG. 18, where a numeric keypad 446 is spaced from the alphabetic/numeric key arrangement. The numeric keypad 446 includes the numbers "7", "8", "9" arranged in a top row, "4", "5", "6" arranged in a second row, "1", "2", "3" arranged in a third row, and "0" in a bottom row, consistent with what may be found on a "ten-key" computer keyboard keypad. Additionally, a numeric phone key arrangement 442 is shown in FIG. 19.

As shown in FIG. 19, the numeric phone key arrangement 442 may also utilize a surface treatment on the surface of the center "5" key. This surface treatment is such that the surface of the key is distinctive from the surface of other keys. Preferably the surface treatment is in the form of a raised bump or recessed dimple 443. This bump or dimple 443 is typically standard on telephones and is used to identify the "5" key through touch alone. Once the user has identified the "5" key, it is possible to identify the remainder of the phone keys through touch alone because of their standard placement. The bump or dimple 443 preferably has a shape and size that is readily evident to a user through touch. An example bump or dimple 443 may be round, rectangular, or have another shape if desired. Alternatively, raised bumps may be positioned on the housing around the "5" key and do not necessarily have to be positioned directly on the key.

It is desirable for handheld mobile communication devices to include a combined text-entry keyboard and a telephony keyboard. Examples of such mobile communication devices include mobile stations, cellular telephones, wireless personal digital assistants (PDAs), two-way paging devices, and others. Various keyboards are used with such devices depending in part on the physical size of the handheld mobile communication device. Some of these are termed full keyboard, reduced keyboard, and phone key pads.

In embodiments of a handheld mobile communication device having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

One device 10 that uses a full keyboard for alphabetic characters and incorporates a combined numeric keyboard is shown in FIG. 21. In this device 10, numeric characters share keys with alphabetic characters on the top row of the QWERTY keyboard. Another device 10 that incorporates a combined alphabetic/numeric keyboard is shown in FIG. 22. This device 10 utilizes numeric characters in a numeric phone key arrangement consistent with the ITU Standard E.161, as shown in FIG. 19. The numeric characters share keys with alphabetic characters on the left side of the keyboard.

In order to further reduce the size of a handheld mobile communication device without making the physical keys or software keys too small, some handheld mobile communication devices use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types of handheld mobile communication devices to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage. The software preferably also has the ability to recognize character letter sequences that are common to the particular language, such as, in the case of English, words ending in "ing." Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone key pad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys" type system uses predictive letter patterns to allow a user to ideally press each key representing a letter only once to enter text. Unlike multi-tap which requires a user to indicate a desired character by a precise number of presses of a key, or keystrokes, the "test on nine keys" system uses a predictive text dictionary and established letter patterns for a language to intelligently guess which one of many characters represented by a key that the user intended to enter. The predictive text dictionary is primarily a list of words, acronyms, abbreviations and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Figure 23:
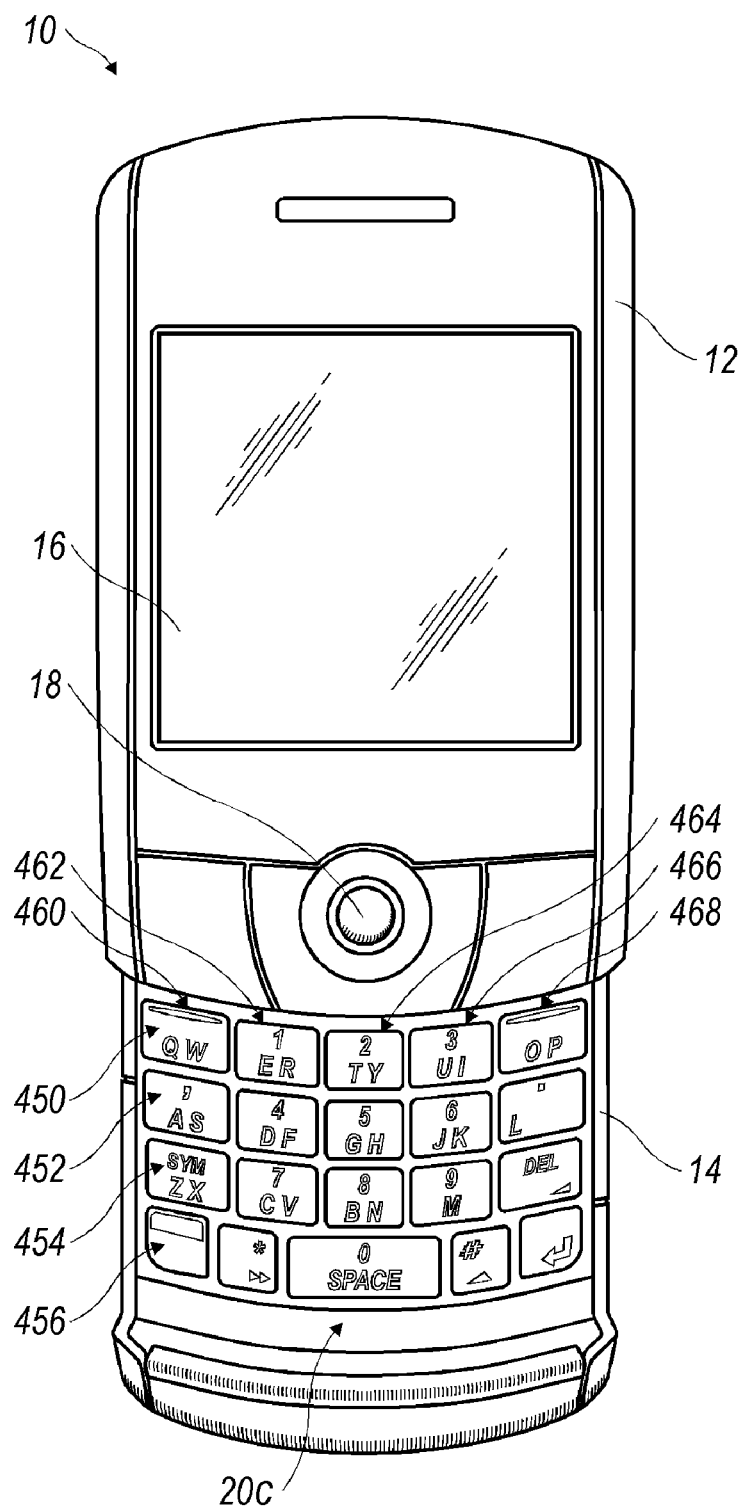
FIG. 23 is a front view of an exemplary handheld mobile communication device including a reduced QWERTY keyboard.

FIG. 23 shows a handheld mobile communication device 10 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 20c. The four rows include a first row 450, a second row 452, a third row 454, and a fourth row 456. The five columns include a first column 460, a second column 462, a third column 464, a fourth column 466, and a fifth column 468. Each of the keys in the first row 450, second row 452, and third row 454 is uniformly sized while the keys in the fourth, bottom row 456 have different sizes relative to one another and to the keys in the first three rows 450, 452, 454. The rows and columns are straight, although the keys in the fourth row 456 do not align completely with the columns because of their differing sizes. The columns substantially align with the longitudinal axis x-x of the device 10.

Figure 24:
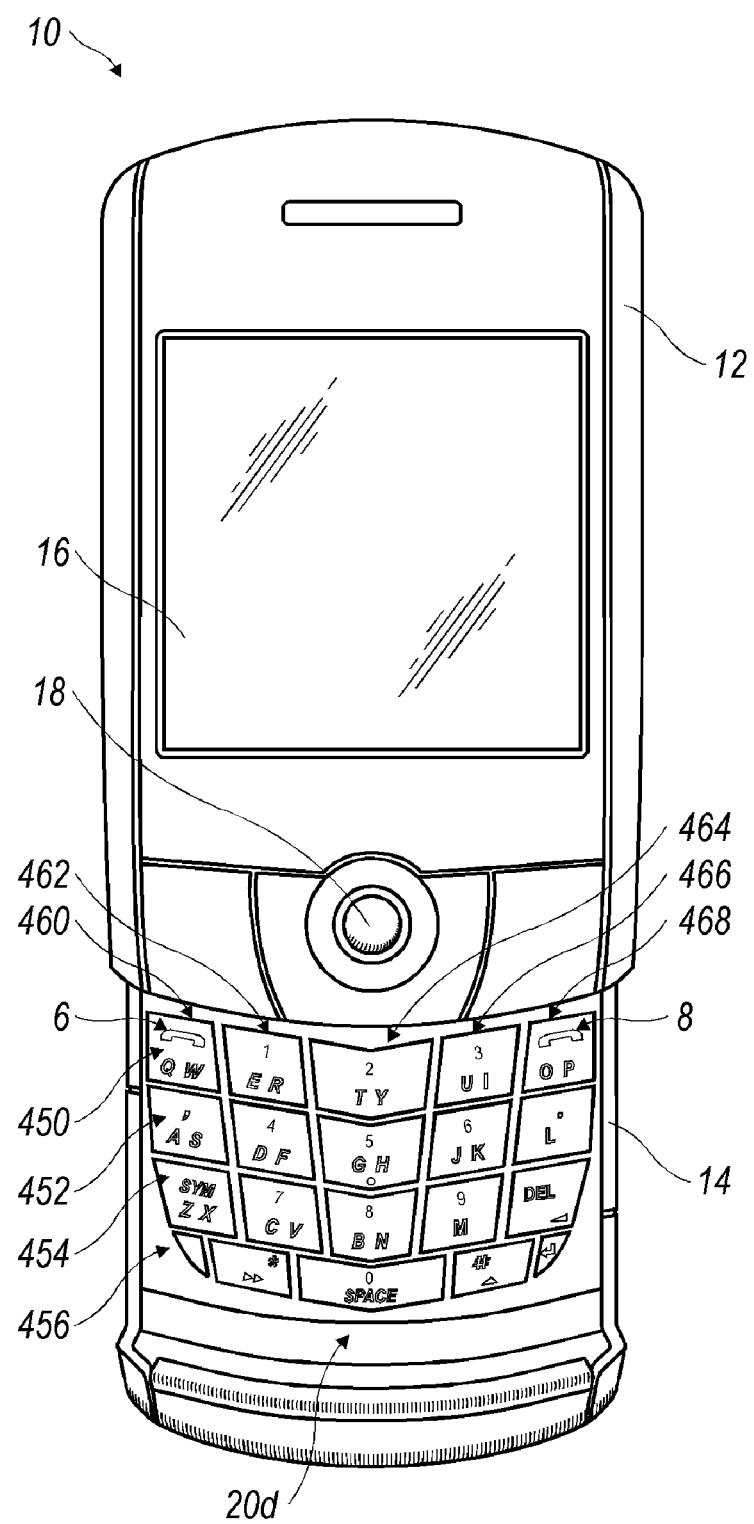
FIG. 24 is a front view of another exemplary handheld mobile communication device including a reduced QWERTY keyboard.

FIG. 24 shows a handheld mobile communication device 10 that has an example physical keyboard array of twenty keys, with five columns and four rows. Fourteen keys on the keyboard 20d are associated with alphabetic characters and ten keys are associated with numbers. The four rows include a first row 450, a second row 452, a third row 454, and a fourth row 456. The five columns include a first column 460, a second column 462, a third column 464, a fourth column 466, and a fifth column 468. Many of the keys have different sizes than the other keys, and the rows are non-linear. In particular, the rows are V-shaped, with the middle key in the third column 464 representing the point of the V. The columns are generally straight, but the outer two columns 460, 462, 466, 468 angle inwardly toward the middle column 464. To readily identify the phone user interface (the second user interface), the numeric phone keys 0-9 include a color scheme that is different from that of the remaining keys associated with the QWERTY key arrangement.

In this example, the color scheme of the numeric phone keys has a two tone appearance, with the upper portion of the numeric keys being a first color and the lower portion of the numeric keys being a second color. In the example, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 20d includes a "send" key 6 and an "end" key 8. The "send" key 6 is positioned in the upper left corner of the keyboard 20d and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

Figure 25:
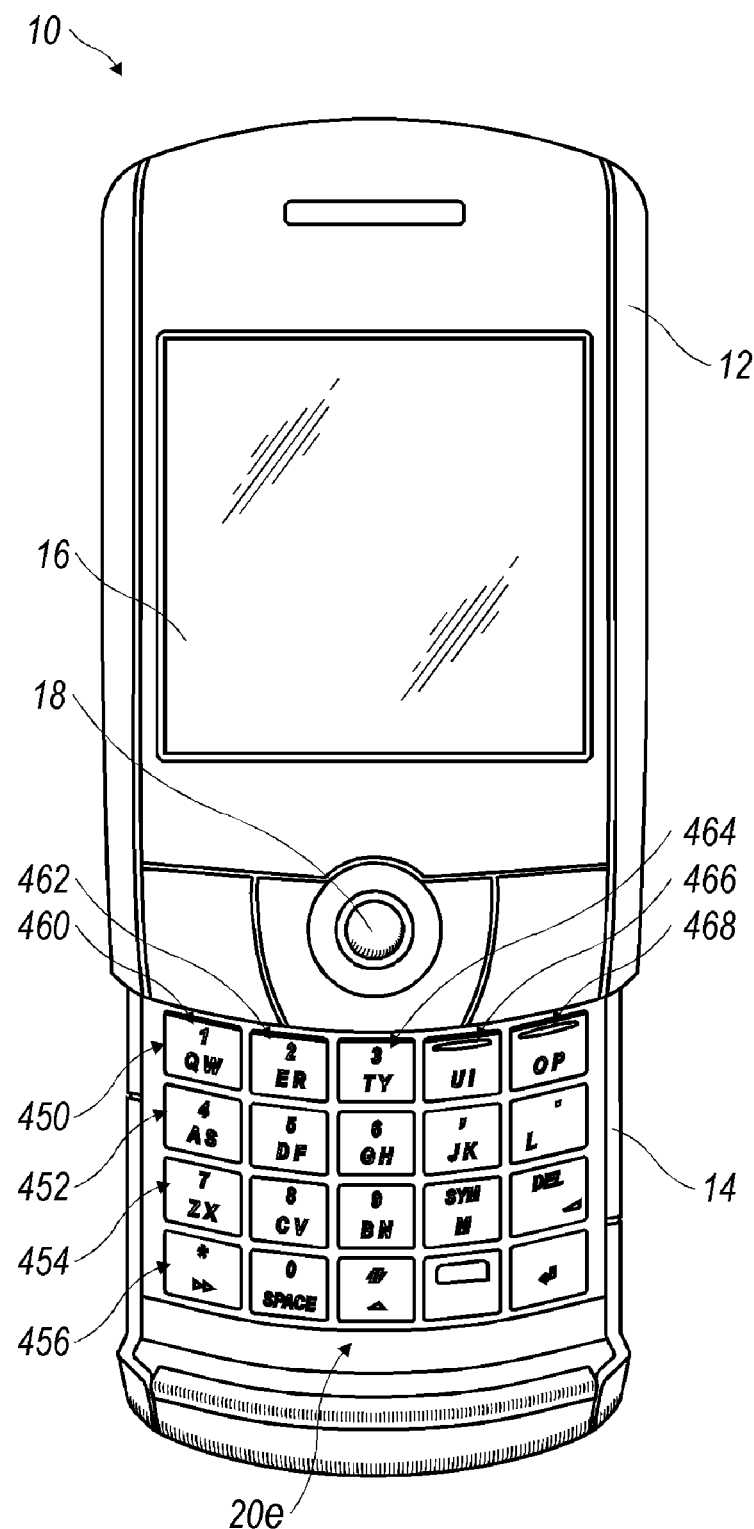
FIG. 25 is a front view of still another exemplary handheld mobile communication device including a reduced QWERTY keyboard.

FIG. 25 shows a similar format for the reduced QWERTY arrangement of alphabetic characters 444 as presented in FIG. 23, but the numeric phone key arrangement is positioned in the first 460, second 462, and third 464 columns instead of being centered on the keyboard 20c. The first row 450 of keys includes in order the following key combinations for the text entry and telephony mode: "QW/1", "ER/2", "TY/3", "UI/", and "OP". The second row 452 includes the following key combinations in order: "AS/4", "DF/5", "GH/6", "JK/,", and "L/.". The third row 454 includes the following key combinations in order: "ZX/7", "CV/8", "BN/9", "M/sym" and "backspace/delete". The fourth row 456 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld mobile communication devices having a phone key pad also typically include alphabetic key arrangements overlaying or coinciding with the numeric keys as shown in FIG. 20. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 19 (no alphabetic letters) and 20 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

The table below identifies the alphabetic characters associated with each number for some other phone keypad conventions.

| | | | | Mobile Phone Keypad | |
| --- | --- | --- | --- | --- | --- |
| Number on Key | ITU E.161 | Australia | #1 | #11 (Europe) | #111 (Europe) |
| 1 | | QZ | | ABC | ABC |
| 2 | ABC | ABC | ABC | DBF | DBF |
| 3 | DBF | DBF | DBF | GHI | GHI |
| 4 | GHI | GHI | GHI | JKL | JKL |
| 5 | JKL | JKL | JKL | MNO | MNO |
| 6 | MNO | MNO | MN | PQR | PQR |
| 7 | PQRS | PRS | PRS | STU | STU |
| 8 | TUV | TUV | TUV | ÚVW | VWX |
| 9 | WXYZ | WXY | WXY | XYZ | YZ |
| 0 | | | OQZ | | |

It should also be appreciated that other alphabetic character and number combinations can be used beyond those identified above when deemed useful to a particular application.

As noted earlier, multi-tap software has been in use for a number of years permitting users to enter text using a conventional telephone key pad such as specified under ITU E 1.161 or on a touch screen display, among other devices. Multi-tap requires a user to press a key a varying number of times, generally within a limited period of time, to input a specific letter associated with the particular key, thereby spelling the desired words of the message. A related method is the long tap method, where a user depresses the key until the desired character appears on the display.

The block diagram of FIG. 26, representing the communication device 300 interacting in the communication network 319, shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is able to perform operating system functions and preferably enables execution of software applications on the communication device 300.

The above described auxiliary I/O subsystem 328 can take a variety of different subsystems including the above described navigation tool 328. As previously mentioned, the navigation tool 328 is preferably a trackball based device, but it can be any one of the other above described tools. Other auxiliary I/O devices can include external display devices and externally connected keyboards (not shown). While the above examples have been provided in relation to the auxiliary I/O subsystem, other subsystems capable of providing input or receiving output from the handheld mobile communication device 300 are considered within the scope of this disclosure.

In a preferred embodiment, the communication device 300 is designed to wirelessly connect with a communication network 319. Some communication networks that the communication device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the MOBITEX mobile communication system, DATATAC mobile communication system, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrowband, data-only technologies mainly used for short burst wireless data transfer.

For the systems listed above, the communication device 300 must be properly enabled to transmit and receive signals from the communication network 319. Other systems may not require such identifying information. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. In some locations, the communication device 300 will be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae 316, 318 in another preferred embodiment are combined into a single antenna (not shown). As one skilled in the art would appreciate, the antenna or antennae 316, 318 in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae 316, 318 as described above, local oscillators (LOs) 313, and a processing module 320 which in a preferred embodiment is a digital signal processor (DSP) 320.

A signal received by the communication device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the communication device 300 to properly transmit the email message over a given communication network 319.

Furthermore, the email message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the email message. Once the email message is generated, the user may execute a send command which directs the email message from the communication device 300 to the communication network 319. In an exemplary embodiment, a keyboard 332, preferably an alphanumeric keyboard, is used to compose the email message. In a preferred embodiment, an auxiliary I/O device 328 is used in addition to the keyboard 332.

While the above has been described in relation to email messages, one skilled in the art could easily modify the procedure to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding handheld mobile communication devices 300 and wireless handheld communication devices 300 as well as the communication networks within which they cooperate. It should be appreciated, however, that a focus of the present disclosure is the enablement of a handheld mobile communication device with moveable display/cover member.

What is claimed is:

1. A handheld mobile communication device comprising:
   a keypad member comprising a plurality of keys by which a user interacts with the device;
   a display member having a graphical display;
   a linkage mechanism configured to couple the display member to the keypad member and to allow the display member to move between a closed position and an open position, a first end of the linkage mechanism being pivotally connected to the display member at at least one of a longitudinally mid portion or a longitudinally rear portion of the display member and an opposite, second end of the linkage mechanism being coupled to the keypad member; and
   a coupling physically separate and distinct from the linkage mechanism, the coupling extending between a front portion of the display member and a front portion of the keypad member, the coupling configured to pivotally and slidingly couple the display member to the keypad member such that the portion of the display member slides only in a direction substantially parallel relative to the keypad member;
   wherein the closed position comprises the display member disposed substantially parallel and adjacent to the keypad member and covering at least a portion of the plurality of keys and wherein the open position comprises the display member disposed at an angle that is greater than 100° and less than 170° relative to the keypad member and exposing to the user the plurality of keys, and
   wherein the graphical display is exposed to the user when the display member is in either of the closed position and the open position.

2. The device of claim 1, wherein the linkage mechanism comprises a two-piece member including an upper and a lower strut that are pivotally interconnected at a pivot joint existing between the first end and the second end of the linkage mechanism.

3. The device of claim 2, wherein the lower strut is slidingly coupled to the keypad member such that at least the lower strut slides within at least one of a slot or a pocket, the at least one of a slot or a pocket formed in the keypad member.

4. The device of claim 3, wherein the at least one of a slot or a pocket further comprises a divot into which at least a portion of the lower strut fits to maintain the angle of the open position relative to the keypad member.

5. The device of claim 1, wherein the linkage mechanism comprises a single, pre-curved member.

6. The device of claim 5, wherein a lower end of the pre-curved member is slidingly coupled to the keypad member such that the pre-curved member slides within at least one of a slot or a pocket, the at least one of a slot or a pocket in the keypad member.

7. The device of claim 6, wherein the at least one of a slot or a pocket further comprises a divot into which at least a portion of the linkage mechanism fits to maintain the angle of the open position relative to the keypad member.

8. The device of claim 5, wherein the linkage mechanism biases the display member toward the open position.

9. The device of claim 1, further comprising a biasing member that biases the display member toward the closed position.

10. The device of claim 1, wherein the linkage mechanism comprises a linkage bar pivotally connected at the first end thereof to the longitudinally mid-portion of the display member and pivotally connected at the second end thereof to the keypad member.

11. The device of claim 1, wherein the display member moves from the closed position to the open position by sliding translationally parallel to the keypad member and pivoting relative to the keypad member.

12. The device of claim 11, wherein the display member moves translationally relative to the keypad member while pivoting relative to the keypad member.

13. The device of claim 1, wherein angle is about 155°.

14. The device of claim 1, wherein the device is at least a cellular telephone having an ear speaker and a microphone and wherein the angle is formed between the ear speaker and the microphone.

15. The device of claim 1, wherein the device is at least an email communication device.

16. The device of claim 1, wherein the device operates at least as both a cellular phone and an email communications device.

17. The device of claim 1, wherein the coupling is further configured to provide sufficient friction for the display member to maintain the angle of the open position relative to the keypad member.

18. A method of providing a handheld communication device comprising:
   providing a keypad member comprising a plurality of keys;
   providing a display member having a graphical display;
   providing a linkage mechanism configured to couple the display member to the keypad member and to allow the display member to move between a closed position and an open position, a first end of the linkage mechanism being pivotally connected to the display member at at least one of a longitudinally mid portion or a longitudinally rear portion of the display member and an opposite, second end of the linkage mechanism being coupled to the keypad member; and
   providing a coupling physically separate and distinct from the linkage mechanism, the coupling extending between a front portion of the display member and a front portion of the keypad member, the coupling configured to pivotally and slidingly couple the display member to the keypad member such that the front portion of the display member slides only in a direction substantially parallel relative to the keypad member;
   wherein the closed position comprises the display member disposed substantially parallel and adjacent to the keypad member and covering at least a portion of the plurality of keys and wherein the open position comprises the display member disposed at an angle that is greater than 100° and less than 170° relative to the keypad member and exposing the plurality of keys, and
   wherein the graphical display is exposed to the user when the display member is in either of the closed position and the open position.

19. The method of claim 18, wherein providing the linkage mechanism further comprises providing the linkage mechanism wherein the linkage mechanism comprises a two-piece member including an upper and a lower strut that are pivotally interconnected at a pivot joint existing between the first end and the second end of the linkage mechanism, and wherein the lower strut is slidingly coupled to the keypad member such that at least the lower strut slides within at least one of a slot or a pocket in the keypad member.

20. The method of claim 18, wherein providing the linkage mechanism further comprises providing the linkage mechanism wherein the linkage mechanism comprises a single, pre-curved member, and wherein a lower end of the pre-curved member is slidingly coupled to the keypad member such that the pre-curved member slides within at least one of a slot or a pocket in the keypad member.

21. The method of claim 18, wherein providing the linkage mechanism further comprises providing the linkage mechanism wherein the linkage mechanism comprises a linkage bar pivotally connected at the first end thereof to the longitudinally mid-portion of the display member and pivotally connected at the second end thereof to the keypad member.

\* \* \* \* \*